United States Patent [19]

Carnell et al.

[11] Patent Number: 4,888,157
[45] Date of Patent: Dec. 19, 1989

[54] SULPHUR COMPOUNDS REMOVAL

[75] Inventors: Peter J. H. Carnell, Cleveland; Patrick J. Denny, Darlington, both of England

[73] Assignee: Imperial Chemical Industries PLC, London, England

[21] Appl. No.: 206,729

[22] Filed: Jun. 15, 1988

Related U.S. Application Data

[63] Continuation-in-part of Ser. No. 39,070, Apr. 16, 1987, abandoned.

[30] Foreign Application Priority Data

Jun. 17, 1987 [GB] United Kingdom ................. 8714232

[51] Int. Cl.$^4$ ...................... C01B 17/16; C01B 31/20; C01B 17/00; B01J 8/00
[52] U.S. Cl. .................................... 423/230; 423/244; 423/245.1

[58] Field of Search ............... 423/230, 244 R, 244 A, 423/245.1

[56] References Cited

U.S. PATENT DOCUMENTS

| 1,947,776 | 2/1934 | Huff et al. | 423/230 |
| 2,551,905 | 5/1951 | Robinson | 423/230 |
| 4,455,286 | 6/1984 | Young et al. | 423/230 |
| 4,690,806 | 9/1987 | Schonfheide | 423/230 |

Primary Examiner—Gregory A. Heller
Attorney, Agent, or Firm—Cushman, Darby & Cushman

[57] ABSTRACT

Carbon dioxide containing gas streams are desulphurised at below 100° C. using high surface area, high porosity, agglomerates containing copper oxide, and zinc oxide and/or an oxide of another element such as aluminium.

11 Claims, No Drawings

SULPHUR COMPOUNDS REMOVAL

This is a continuation-in-part of copending applications Ser. No. 07/039,070 filed Apr. 16, 1987 and Ser. No. 07/188,104, filed Apr. 27, 1988, said application Ser. No. 07/188,104 being a continuation of application Ser. No. 07/000,386 filed Jan. 5, 1987, now abandoned.

This invention relates to the removal of sulphur compounds from fluid streams.

Fluids, e.g. gases such as natural gas, or liquids such as NGL or liquid refinery products, often contain a small proportion of sulphur compounds such as hydrogen sulphide, mercaptans, and carbonyl sulphide.

Removal of such sulphur compounds can be effected by passing the fluid through a bed of a suitable absorbent. For many applications a bed of a zinc oxide composition is suitable, particularly high surface area and high porosity zinc oxide compositions such as the material sold by Imperial Chemical Industries plc as "Catalyst 75-1", which exhibits good absorption characteristics at low temperatures, e.g. below 100° C. We have found however that where the fluid contains carbon dioxide and the absorption is effected at low temperatures, the efficiency of the zinc oxide absorbents is less than when treating carbon dioxide-free fluids. It is believed that this is the result of the formation of zinc carbonate which is a less efficient absorbent for sulphur compounds than zinc oxide.

We have found that certain compositions comprising oxides and/or carbonates of copper are more effective than zinc oxide compositions as sulphur compound absorbents for the treatment of fluids containing carbon dioxide at low temperatures.

It has been proposed in U.S. Pat. No. 4,521,387 to use as an absorbent for sulphur compounds a composition obtained by reducing, with a hydrogen/nitrogen mixture, a pelleted calcined precipitate resulting from the co-precipitation of copper, zinc, and aluminium compounds with a base. This reference discloses the use of the composition to treat carbon dioxide containing a small amount of hydrogen at 100° C.

For many applications, e.g. oil or gas purification on an offshore rig, a source of hydrogen is not available: also such hydrogen-reduced materials tend to be pyrophoric and hence present a possible hazard if not handled with care.

In U.S. Pat. No. 4,593,148, commercially available catalysts that are normally used in low temperature shift processes, and comprising oxides of copper, zinc, and aluminium, in a pelleted form were used to treat gas streams containing arsine, and hydrogen sulphide at temperatures in excess of 30° C.

We have found that certain compositions, when in a particular physical form, are especially capable of absorbing the aforesaid sulphur compounds without the need for a reduction step or for the presence of a reducing gas even when the absorption is conducted at low temperatures.

The absorbents employed in the present invention comprise agglomerates of particles of an intimate mixture of oxides, hydroxides, carbonates and/or basic carbonates of (a) copper, and (b) zinc and/or at least one element X selected from aluminium, silicon, and metals of Group IIIA, Group IVA, Group VA, Group VIA and Group VIIA of the Periodic Table (as published in the "Abridgements of Patents" by the UK Patent Office).

The agglomerates are characterised by a high surface area (as measured on the agglomerates when calcined, by the BET method using liquid nitrogen) and a low density. The BET surface area is at least 80, preferably at least 100, $m^2.g^{-1}$. Typically the agglomerates have an average size within the range 1 to 10 mm. Prior copper/zinc/aluminium or copper/zinc/chromium compound agglomerates of such size, for example as used as catalysts for methanol synthesis or for the low temperature shift reaction, generally have a calcined density of at least 1.6, typically 1.8 to 2.0 $g.cm^{-3}$. In contrast thereto, the agglomerates of the present invention have a calcined density of not more than 1.5 $g.cm^{-3}$. By the term calcined density we mean the mercury density of a sample of the agglomerates that have been calcined for 4 hours at 350° C. The agglomerates also have a high porosity, preferably at least 0.6, as calculated from the mercury density of the calcined agglomerates and the weighted average of the single crystal densities of the components expressed as oxides. The agglomerates have a preferred minimum pore volume of 0.4 $cm^3.g^{-1}$. The term pore volume is defined as meaning the porosity of the agglomerates divided by the calcined density of the agglomerates.

Accordingly the present invention provides a process for the removal of sulphur compounds such as carbonyl sulphide, mercaptans, and hydrogen sulphide from a fluid stream containing at least 0.1% by volume of carbon dioxide, comprising passing said fluid stream, at a temperature below 100° C., through a bed of absorbent, capable of absorbing said sulphur compounds characterised in that said absorbent is in the form of unreduced agglomerates having a size in the range 1 to 10 mm;

a BET surface area when calcined of at least 80 $m^2.g^{-1}$;

a calcined density of not more than 1.5 $g.cm^{-3}$; and comprising compounds of (a) copper, and (b) zinc and/or at least one element X selected from aluminium, silicon, and metals of Groups IIIA, IVA, VA, VIA, and VIIA of the Periodic Table, said compounds being in the form of oxides, hydroxides, carbonates and/or basic carbonates, in such proportions that the copper atoms form 30–97%, preferably 50–95%, of the total number of copper, zinc, and element X atoms in said agglomerates; and said agglomerates having a total copper and zinc (when present) compound content such that, after ignition at 900° C., the cupric oxide plus zinc oxide (when present) content of the ignited composition is at least 70%, preferably at least 80%, by weight.

The proportions of zinc and element X compounds are preferably such that the zinc atoms constitute 0 to 60%, particularly at least 5%, and more particularly 10 to 40%, and said element X atoms constitute 0 to 30%, particularly 5 to 20%, of the total copper, zinc and element X atoms in the agglomerates.

Element X is preferably aluminium, manganese, silicon, titanium, zirconium, or chromium; and in particular is aluminium.

In order to obtain the high BET surface area, copper is preferably precipitated, or copper and zinc are preferably co-precipitated, as hydroxides, carbonates or basic carbonates. The element X compound or compounds, if used, may be incorporated by co-precipitation with the copper, or copper and zinc; and/or by mixing a separately precipitated element X compound, or compounds, with the copper, or copper and zinc, precipitate; and/or by precipitating the element X compound, or compounds, on to the copper, or copper and zinc, precipitate.

The precipitation is preferably effected using an alkali metal carbonate, particularly sodium carbonate, as precipitant. The copper, or copper and zinc, is preferably precipitated as malachite, or zinc substituted malachite.

After precipitation, the composition is dried and optionally calcined, e.g. at 200° to 450° C. The dried, or calcined, precipitate is then mixed with a suitable binder, e.g. a calcium aluminate cement, phosphates, or organic materials such as starch, gums, polyvinyl alcohol, plus a little water and then granulated or extruded to give the required size agglomerates. The presence of a binder is desirable to obtain a product of adequate strength without the need for subjecting the composition to such high shaping forces that the calcined density of the agglomerates is greater than 1.5 g.cm$^{-3}$.

The binder is preferably a calcium aluminate cement. By the term calcium aluminate cement we include such calcium aluminate compounds as calcium monoaluminate ($CaO.Al_2O_3$), tricalcium aluminate ($3CaO.Al_2O_3$), pentacalcium trialuminate ($5CaO.3Al_2O_3$), tricalcium penta aluminate ($3CaO.5Al_2O_3$), dodeca calcium hepta aluminate ($12CaO.7Al_2O_3$) and high alumina cements which may contain alumina in admixture with, dissolved in, or combined with such calcium aluminate compounds. For example, a well known commercial high alumina cement has a composition corresponding to about 18% calcium oxide, 79% alumina and 3% water and other oxides. The amount of such a cement binder is preferably 5 to 15% by weight, and particularly 5 to 10% by weight of the dried or calcined precipitate from which the agglomerates are subsequently formed.

Alternatively, the dried composition may be converted to the oxide form after granulation. This can be achieved by first drying the wet agglomerates at a suitable temperature, typically 110° C., and for an appropriate time, typically four hours, and then calcining the dried agglomerates, suitably at 350° C. for four hours, so as to obtain the desired oxide form.

The agglomerates preferably contain some precipitated element X compound in addition to any element X compound present as a binder: element X compound as binder particles can be distinguished from element X compound as precipitate intimately mixed with the copper, or copper and zinc, compounds by microscopic examination. Preferably at least 50% of the element X atoms are present as a precipitated compound, or compounds, containing said element X atoms in intimate admixture as aforesaid with the copper, or copper and zinc, compounds. However the aforesaid proportions of copper, zinc, and element X atoms in the agglomerates include any such element X atoms present in a binder.

The agglomerates are used for sulphur compounds absorption by passing the fluid stream from which sulphur compounds are to be absorbed through a bed of agglomerates. The bed will generally have a tapped bulk density below 1.0, and preferably below 0.95 g.cm$^{-3}$.

The absorption is preferably conducted at a temperature below 90° C. and can be at ambient temperatures, or even lower, e.g. as low as $-10°$ C. In addition to absorbing the aforesaid sulphur compounds, acid gases such as hydrogen cyanide, hydrogen halides, e.g. chloride, nitric oxide, nitrogen dioxide, chlorine, sulphur dioxide, and sulphur trioxide will also be absorbed.

The agglomerates may be used for the removal of sulphur compounds as aforesaid from any fluid stream containing carbon dioxide. Examples of suitable fluid streams, in addition to streams consisting essentially of carbon dioxide, are fluid streams containing smaller proportions of carbon dioxide including fluids which contain less than 10% by volume, of carbon dioxide such as natural gas, substitute natural gas, reforming gases, liquid hydrocarbons, and air. The advantage of the use of the copper oxide containing compositions over the conventional zinc oxide compositions is apparent even where the gas stream contains quite small amounts of carbon dioxide, e.g. below 0.5% by volume. We prefer however that the fluid comprises at least 50%, and particularly at least 75% carbon dioxide. The effectiveness of the absorbents may in some cases be facilitated by the use of a fluid stream containing water, or water vapour. Thus where the stream is gaseous, it is preferably saturated, or near saturated (>90% relative humidity).

The fluid is preferably free of reducing gases such as carbon monoxide or hydrogen.

The fluid may be at any convenient pressure and will generally be in the range 1 to 150 bar abs.

The invention is illustrated by the following examples.

EXAMPLE 1

A first slurry was made by mixing, at 65° C., an aqueous solution of sodium aluminate with an aqueous solution of zinc nitrate and sufficient nitric acid to bring the slurry to neutrality. A second slurry of copper and zinc basic carbonates was made by mixing, at 65° C., an aqueous solution containing copper and zinc nitrates with an aqueous sodium carbonate solution in such proportions to give a slurry of pH 6.5. The two slurries were mixed and then filtered, and the precipitate washed until sodium free. The resulting precipitate was dried at 110° C. for 16 hours.

The proportions of copper and zinc nitrates and sodium aluminate were such that the relative atomic proportions of copper, zinc, and aluminium in the product were 55:27:18.

The dried precipitate was mixed with about 6% by weight of calcium aluminate cement. Water, insufficient to give a slurry, was added and the wet mixture was then granulated to give agglomerates of 1.7 to 2.5 mm size. The wet agglomerates were then dried at 110° C. for 4 hours.

The agglomerates had an approximate copper:zinc:aluminium atomic proportion of 51:26:23. A sample of the agglomerates was calcined at 350° C. for 4 hours: this calcined sample had a calcined density of 1.1 g.cm$^{-3}$, and a BET surface area of 105 m$^2$.g$^{-1}$.

After ignition of a sample of the agglomerates to 900° C., cupric oxide and zinc oxide formed a total of about 83% by weight of the composition.

The absorption capability of the uncalcined agglomerates was assessed by the following technique:

In order to accelerate the effect of carbon dioxide the agglomerates, together with a small amount of water, were sealed in an atmosphere of carbon dioxide at 25° C. and 65 bar abs. for 16 hours. The agglomerates were then charged to a vessel to form therein a vertical bed of height 12 cm and having a height to diameter ratio of 5. To assess the sulphur absorption capacity, "dry" natural gas containing 1% by volume hydrogen sulphide, 0.5% by volume of carbon dioxide, and about 100 ppm v/v of water was passed at atmospheric pressure and 20° C. down through the bed at a space velocity of 700 hr$^{-1}$ and the time, T, taken before hydrogen sulphide was detected in the exit gas was determined. Samples were then taken from different heights in each bed and analysed for sulphur content. Using another sample of the carbon dioxide treated agglomerates, the hydrogen sulphide adsorption procedure was repeated using "wet" natural gas produced by saturating the "dry" natural gas with water at 20° C.

The test was repeated using high surface area zinc oxide agglomerates (ICI "Catalyst 75-1" which consists essentially of agglomerates of zinc oxide bound with a calcium aluminate cement binder).

The test procedure, but omitting the carbon dioxide pretreatment, was repeated using a sample of the copper oxide/zinc oxide/alumina agglomerates that had been calcined for 4 hours at 350° C.

The results are set out in the following table.

| Agglomerates | Gas | Time, T, to breakthrough (min) | Sulphur content (% w/w) Maximum | top ⅔ of bed |
|---|---|---|---|---|
| CuO/ZnO/Al$_2$O$_3$ | dry | 387 | 19.1 | 16.2 |
| ZnO | dry | 25 | 1.1 | 1.0 |
| CuO/ZnO/Al$_2$O$_3$ | wet | 477 | 19.9 | 16.4 |
| ZnO | wet | 88 | 4.0 | 2.8 |
| CuO/ZnO/Al$_2$O$_3$* | dry | 275 | 12.9 | 9.3 |
| CuO/ZnO/Al$_2$O$_3$ | wet | 618 | 20.1 | 18.2 |

*calcined agglomerates, no carbon dioxide pretreatment.

EXAMPLE 2

The absorption capacity of the agglomerates of Example 1 can be further illustrated by reference to data obtained from an industrial sulphur removal unit.

The uncalcined agglomerates were compared with two commercially available materials, both of which comprise zinc oxide. The first comparative material ZnO(1) being the aforesaid high surface area zinc oxide agglomerates—ICI "Catalyst 75-1". The second comparative material ZnO(2) comprises zinc oxide extrudates having a diameter of 0.07 cm, an average length of 0.16 cm and a zinc oxide content, after ignition of 900° C., of more than 88%. This second comparative material being recommended by the manufacturers for use at high temperatures for the removal of sulphur.

The conditions under which the data were collected are as follows:

| | Gas Composition (v/v) | |
|---|---|---|
| Carbon dioxide | >99% | |
| Hydrocarbons | 543 | ppm |
| Water | 400 | ppm |
| Hydrogen sulphide | 25 | ppm |
| Other sulphur compounds | 1.3 | ppm |
| Temperature (°C.) | 15–20 | |
| Pressure (Bar absolute) | 48 | |

The data obtained from the industrial sulphur removal unit are shown in the following table.

| | Sulphur content (% w/w) | |
|---|---|---|
| Agglomerates | Maximum | Inlet ⅔ of bed |
| CuO/ZnO/Al$_2$O$_3$ | 20.0 | 19.5 |
| ZnO (1) | 11.0 | 9.0 |
| ZnO (2) | 6.0 | 3.0 |

It is thus seen that the sulphur removal can be accomplished more efficiently by the process of the invention.

We claim:

1. In a process for the removal of sulphur compounds from a sulphur compound-containing fluid stream comprising at least 0.1% by volume of carbon dioxide, wherein said sulphur compounds are selected from the group consisting of carbonyl sulphide, mercaptans, and hydrogen sulphide, which process comprises passing said fluid stream, at a temperature below 100° C., through a bed of absorbent capable of absorbing said sulphur compounds, the improvement comprising using said absorbent in the form of unreduced agglomerates, said agglomerates having:
    a size in the range 1 to 10 mm;
    a BET surface area when calcined of at least 80 m$^2$.g$^{-1}$;
    a calcined density of not more than 1.5 g.cm$^{-3}$;
and said agglomerates comprising:
    at least one copper compound; and
    at least one element A compound, wherein element A is
        selected from the group consisting of zinc, aluminum, silicon, and metals of Groups IIIA, IVA, VA, VIA, and VIIA of the Periodic Table; .
said copper compound and said element A compound being in a form selected from the group consisting of oxides, hydroxides, carbonates and basic carbonates, and being present in such proportions that:
    the number of copper atoms form 30–97% of the total number of copper and said element A atoms in said agglomerates; and
    after ignition of said agglomerates at 900° C., thereby forming ignited agglomerates, the content of cupric oxide plus any zinc oxide present in said ignited agglomerates is at least 70% by weight.

2. A process according to claim 1 in which said agglomerates contain at least one compound containing aluminium.

3. A process according to claim 1 in which said agglomerates contain at least one precipitated compound of said element X intimately mixed with precipitates of said copper and zinc (when present) compounds, the element X atoms in said at least one precipitated element X compound constituting at least 50% of the total element X atoms in said agglomerates.

4. A process according to claim 1 in which said agglomerates contain 5 to 15% by weight of a cement binder.

5. A process according to claim 1 in which the sulphur compounds are removed from said fluid stream at a temperature below 25° C.

6. A process according to claim 1 in which said fluid stream comprises at least 0.5% by volume of carbon dioxide.

7. A process according to claim 6 in which said fluid stream comprises at least 50% by volume of carbon dioxide.

8. A process according to claim 7 in which said fluid stream comprises at least 75% by volume of carbon dioxide.

9. A process according to claim 1 in which said agglomerates contain at least one compound selected from the group consisting of zinc oxide, zinc hydroxide, zinc carbonate and zinc basic carbonate, in such proportions that the zinc atoms constitute 10 to 40% of the total number of copper atoms.

10. A process according to claim 1 wherein said at least one element A compound comprises at least one element X compound, wherein element X is selected from the group consisting of aluminum, silicon, and metals of Groups IIIA, IVA, VA, VIA, AND VIIA of the Periodic Table in such proportions that the total number of element X atoms in the agglomerates constitutes 5 to 20% of the total number of copper and element A atoms.

11. A process according to claim 1 in which said agglomerates comprise an intimate mixture of precipitated copper compounds, and precipitated element A compounds including at least one precipitated element X compound wherein element X is selected from the group consisting of aluminum, silicon, and metals of Groups IIIA, IVA, VA, VIA, and VIIA of the Periodic Table in such proportions that the number of element X atoms in said precipitated element X compound constitutes at least 50% of the total number of element X atoms in said agglomerates.

* * * * *